H. VASS.
TRACTOR WHEEL.
APPLICATION FILED JUNE 26, 1919.
1,346,145.
Patented July 13, 1920.
2 SHEETS—SHEET 1.
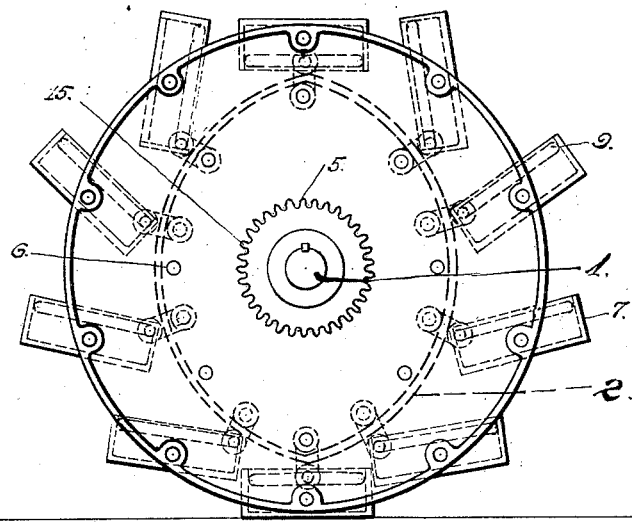
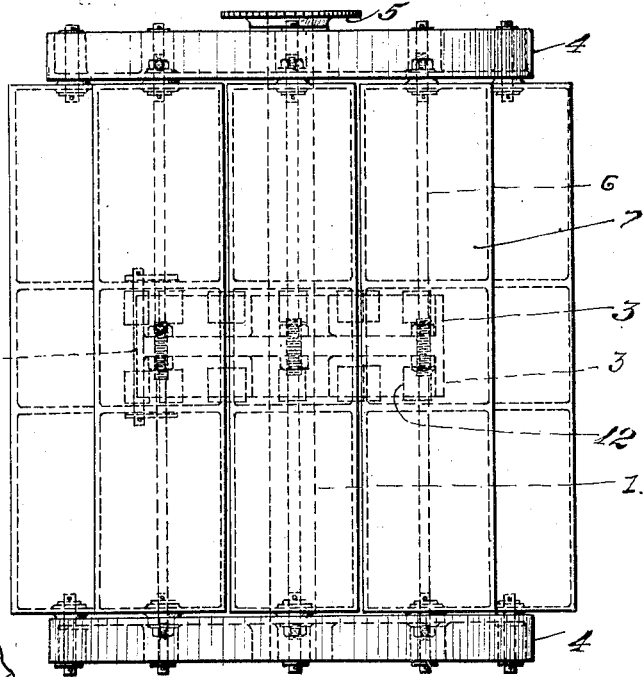
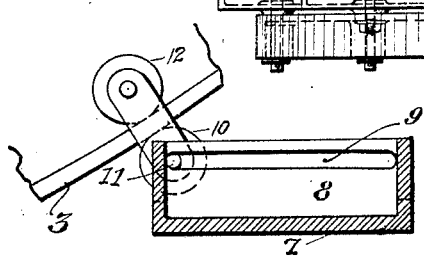
INVENTOR
HARRY VASS
BY
William Richards
ATTORNEY

H. VASS.
TRACTOR WHEEL.
APPLICATION FILED JUNE 26, 1919.

1,346,145.

Patented July 13, 1920.
2 SHEETS—SHEET 2.

INVENTOR
HARRY VASS
BY
William E Richards
ATTORNEY

UNITED STATES PATENT OFFICE.

HARRY VASS, OF SUMMIT, NEW JERSEY.

TRACTOR-WHEEL.

1,346,145.                    Specification of Letters Patent.        Patented July 13, 1920.

Application filed June 26, 1919. Serial No. 306,899.

*To all whom it may concern:*

Be it known that I, HARRY VASS, a citizen of the United States, residing at Summit, county of Union, and State of New Jersey, have invented certain new and useful Improvements in Tractor-Wheels, of which the following is a specification.

This invention relates to tractor wheels for hauling over wet or swamp ground, or other rough road; my tractor may also be used for military purposes to displace the well known tank.

Briefly my invention consists of a pair of wheels connected rigidly by tie rods, and pivoted on a fixed axle. A cam on said axle guides a number of blades or shoes which rotate with said wheels, so that the bottom of each blade in turn contacts with the ground. The blades are flat or curved bottomed for hauling, and have prongs or knives attached for plowing.

One object of my invention is to provide a tractor for plowing or cultivating the soil or irregular, wet, or swampy ground.

Another object of my invention is to provide a tractor suitable for hauling on irregular, wet, or swampy ground, and suitable for military use in place of the tank.

These and other objects will become apparent in the description below, in which characters of reference refer to similarly marked parts on the drawings.

Figure 1 is a side elevation of the tractor.

Fig. 2 is a longitudinal elevation of the tractor.

Fig. 3 is an enlarged view showing the method of attaching the tractor blades.

Figure 4:
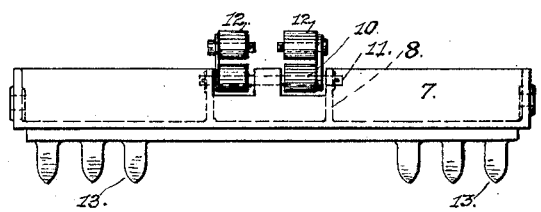
Fig. 4 is a front view of a blade showing the knives or prongs attached for plowing or cultivating the soil, and the means of engaging the same with the cam flanges 3.

The axle of the tractor wheel is indicated by 1, and has a substantially elliptic cam 2 rigid thereon. Said cam has peripheral flanges 3 on both sides. Wheels 4 are pivotally mounted on the ends of said axle; the axle 1 is non-movably mounted on the tractor frame, not shown. A sprocket wheel 5 is fixed about the hub of each wheel 4 so that the same may be driven by a chain. Tie rods 6, equally spaced, extend horizontally between the wheels 4 and are rigidly mounted in said wheels. A blade or shoe 7 is pivoted on each rod; said shoe is substantially rectangular, being hollow and open at the top. The shoe is balanced on said rod 6 through holes in its ends near the lower part thereof.

Cross frames 8 are mounted within each shoe, equidistant from its center, as shown in Fig. 4, each frame is slotted at 9. A roller 10 extends between the frames 8 of a shoe and its ends are supported and guided in said slots; said roller is movable lengthwise of said slots. A short, thin U-shaped rod 11 is pivoted at one end in each end of said roller 10, the other ends of said rod providing pintles for the pivotal support of short rollers 12, in alinement. Said short rollers 12 of each shoe pass under the flanges 3, as shown in Fig. 3, and engage the inside surfaces of said flanges to be guided thereby.

The operation of the tractor will now be described, with reference particularly to Fig. 1. Assume the tractor to be moving toward the left in Fig. 1. Since all the shoes 7 are similar and similarly attached, let us assume Fig. 1 to indicate the cycle of motion and successive positions of a single shoe during one revolution of the wheels 4, beginning at the lowermost position, with the roller 10 in the center of the slot 9. As the shoe rises on the right side, the roller 9 is drawn to the left, tipping the left end of the roller downward and raising the right. This degree of tipping of the roller will continue to increase as the shoe rises, until it mounts to nearly the top of the cam, when it is so far tipped that it topples over, the roller 10 then moving to the other end of the slot 9. As the shoe continues downward, the reverse of its previous behavior occurs, that is, it now gradually approaches a horizontal position, which it assumes on reaching the bottom of the cam 2.

Figure 5:
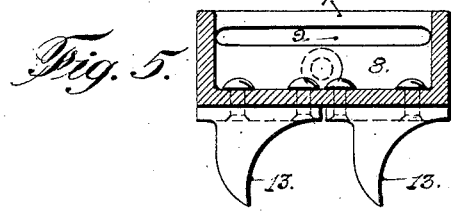
Fig. 5 is an end view of a blade with said knives attached.
Figure 6:
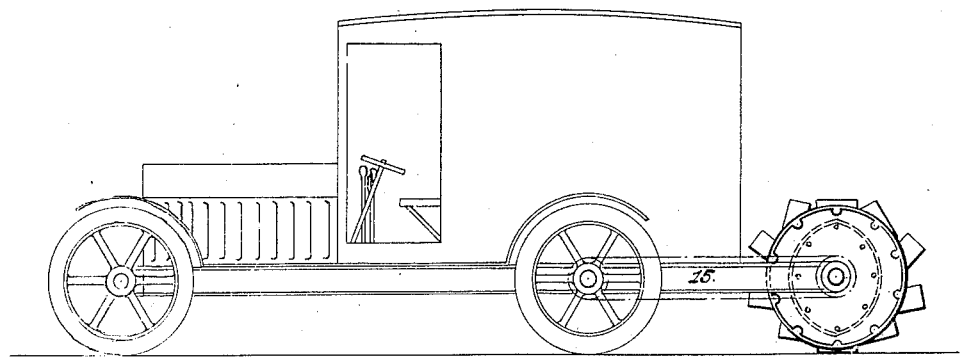
Fig. 6 is a diagrammatic side elevation of an armored car having a number of tractor wheels attached.

Thus it is apparent that each shoe in its turn secures a broad surface and frictionless contact with the ground, making travel over soft earth easy. Figs. 4 and 5 show blades or knives 13 mounted in rows, preferably staggered, for plowing or cultivating the soil. Fig. 6 shows a number of tractor wheels 14, similar to that of Fig. 1, attached to an armored car for military purposes, 15 indicating a frame to which the axles 1 are rigidly connected.

Having thus described my invention, what I claim and desire to secure by Letters Patent, is:—

1. A device of the class described comprising a pair of wheels pivoted on an axle, a plurality of shoes pivoted between said wheels, and means on said axle to guide said shoes so that the same always assume a horizontal position when contacting with the ground, said means including a cam fixed to the axle, and a device carried by the shoe and adapted to move along said cam as the wheels rotate.

2. A device of the class described comprising a pair of wheels pivoted on an axle, a plurality of shoes pivoted between said wheels, and means on said axle to guide said shoes so that the same always assume a horizontal position when contacting with the ground and each shoe makes a complete revolution about its pivot during one revolution of said wheels.

3. A device of the class described comprising a pair of wheels pivoted on an axle, a plurality of shoes pivoted between said wheels, and means on said axle to guide said shoes so that the same always assume a horizontal position when contacting with the ground and each shoe makes a complete revolution about its pivot during one revolution of said wheels, said means comprising a cam having flanges, on said axle, frames, having slots, on said shoes, movable in said slots, and means connected with said roller contacting with the interior of said flanges.

4. A tractor device comprising a pair of wheel pivoted on an axle, a plurality of shoes pivoted between said wheels, blades on the bottom of said shoes, and means on said axle to guide said shoes so that the same always assume a horizontal position when contacting with the ground and each shoe makes a complete revolution about its pivot during one revolution of said wheels.

5. A device of the class described comprising a pair of wheels pivoted on an axle, a plurality of shoes pivoted between said wheels, and means on said axle to guide said shoes so that the same always assume a horizontal position when contacting with the ground and each shoe makes a complete revolution about its pivot during one revolution of said wheels, said means comprising a cam having flanges, on said axle, frames, having slots, on said shoes, movable in said slots, and means connected with said roller contacting with the interior of said flanges and means on said wheels for turning the same.

In testimony whereof I have affixed my signature.

HARRY VASS.